United States Patent [19]
Cummings et al.

[11] Patent Number: 5,656,005
[45] Date of Patent: Aug. 12, 1997

[54] METHOD AND APPARATUS FOR AUTOMATICALLY FORMING CORRUGATED SHEETS INTO BLOCK-SHAPED UNITS OF OPTIMAL SIZE

[75] Inventors: James A. Cummings, Phillips; David W. Hess, Madison; Marajo Reis, Madison; Michael C. Chao, Madison, all of Wis.

[73] Assignee: Marquip, Inc., Phillips, Wis.

[21] Appl. No.: 428,388

[22] Filed: Apr. 24, 1995

[51] Int. Cl.$^6$ .................................................. B31B 1/00
[52] U.S. Cl. .......................... 493/3; 493/463; 414/902; 364/478.05; 364/478.18; 364/478.11
[58] Field of Search ............ 414/902; 364/478.02, 364/478.05, 478.18, 478.11, 478.16; 493/3, 8, 25, 26, 29, 463

[56] References Cited

U.S. PATENT DOCUMENTS

| | | | |
|---|---|---|---|
| 3,730,357 | 5/1973 | Beaty | 214/6 DK |
| 3,850,319 | 11/1974 | Di Frank | 214/152 |
| 4,188,861 | 2/1980 | Kroeze et al. | 493/463 |
| 4,641,271 | 2/1987 | Konishi | 364/478 |
| 4,692,876 | 9/1987 | Tenma et al. | 364/513 |
| 4,900,297 | 2/1990 | Frost et al. | 493/82 |
| 5,004,401 | 4/1991 | Tsubone et al. | 414/786 |
| 5,163,808 | 11/1992 | Tsubone et al. | 414/791.8 |
| 5,175,692 | 12/1992 | Mazouz | 367/478 |
| 5,203,671 | 4/1993 | Cawley | 414/791.6 |
| 5,211,528 | 5/1993 | Kato | 414/789.6 |
| 5,249,131 | 9/1993 | Kato | 364/478.05 |
| 5,415,518 | 5/1995 | Montgomery | 414/791.6 |
| 5,501,571 | 3/1996 | van Durrett et al. | 414/786 |

FOREIGN PATENT DOCUMENTS

| | | | |
|---|---|---|---|
| 0399623 | 11/1990 | European Pat. Off. | 493/1 |

*Primary Examiner*—Joseph J. Hail, III
*Assistant Examiner*—Christopher W. Day
*Attorney, Agent, or Firm*—Andrus, Sceales, Starke & Sawall

[57] ABSTRACT

A method and apparatus is disclosed for constructing block-shaped units of corrugated sheet material that are easily banded because of the absence of any irregularities in the units, and the units are as close to being cube-shaped as is possible for a given set of parameters. The automated stacking system comprises a computer programmed to determine a set of solutions to optimize a unit by determining an optimal number of corrugated sheets per bundle, and an optimal number of bundles per tier, and an optimal number of tiers per unit based upon customer order parameters. The system is initially set up with machine parameters defining machine constraints and a set of algorithm parameters which comprise desirability weighting factors. The desirability weighting factors allow a customer to customize the system according to preferred operating criteria. The system is capable of finding all practical solutions to create an optimal unit, and ranks the solutions according to the desirability weighting factors to provide the customer with an optimal unit sized according to its own desires and needs. The automated stacking system further comprises an accumulator/separator, a bidirectional conveyor, a tier inverter, a fork section, and a unitizer section, all for forming the bundles of corrugated sheets into tiers, and the tiers into units.

28 Claims, 7 Drawing Sheets

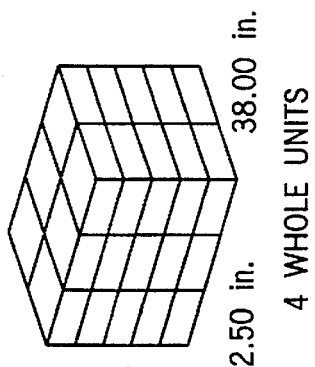

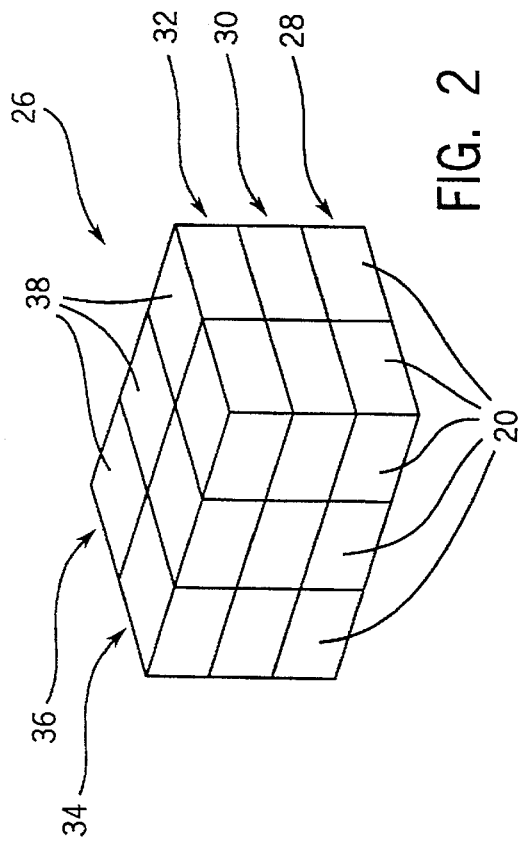

FIG. 2

SOLUTION #5

UNIT HEIGHT: 35.91 in.  BUNDLE HEIGHT: 7.18 in.   TOTAL WHOLE UNITS: 4
TIERS PER UNIT: 5       20 BUNDLES OF 42 SHEETS EACH   NO PARTIAL UNIT
TIER PATTERN:              (4 DISCHARGES)
  2 BUNDLES LONG       100 BUNDLES OF 43 SHEETS EACH
  3 BUNDLES WIDE          (20 DISCHARGES)
BUNDLES PER UNIT: 30   TOTAL BUNDLES: 120 (24 DISCHARGES)

20 BUNDLES X 42 SHEETS/BUNDLE + 100 BUNDLES X 43 SHEETS/BUNDLE = 5140 TOTAL SHEETS

THE LINE MUST BE SLOWED TO 221.7 FEET PER MINUTE. (CAUSE: STACKER)
DESIRABILITY: 1.11 (LINE) + 0.46 (MARGIN) + 1.50 (UNITS) + 0.75 (LAST) + 0.75 (LEFTOVERS) + 0.34 (ASPECT) = 4.91

FIG. 11

MACHINE PARAMETERS

MAX. UNIT HEIGHT: 72.00 in.
MAX. UNIT LENGTH: 110.00 in.
MAX. UNIT WIDTH: 60.00 in.

MAX. FORK HEIGHT: 74.00 in.

MAX. BUNDLE HEIGHT: 18.00 in.
MIN. BUNDLE HEIGHT: 2.00 in.

SIDE-SHIFT ENABLED: YES

MIN. BTU CYCLE TIME: 10.0 secs.
DESIRED BTU TIME MARGIN: 5.0 secs.
MIN. STACKER CYCLE TIME: 18.0 secs.

MAX. SINGLEWALL SPEED: 1000.0 ft./min.
MAX. DOUBLEWALL SPEED: 600.0 ft./min.

AUTO-LEVELING
 DESIRED UNIT HEIGHT: 48.00 in.
 MAKE WHOLE UNITS ONLY: YES

AUTO-TIER-PATTERNING

ORDER PARAMETERS

SHEET LENGTH: 19.00 in.
SHEET WIDTH: 17.50 in.

BOARD TYPE: SINGLEWALL
CALIPER: 0.1670 in.

OUTS PER DISCHARGE: 5
CUTS: 1028
TOTAL SHEETS: 5140

PALLET HEIGHT: 4.00 in.

ALOGORITHM PARAMETERS

LINE SPEED RATIO: 2.00
NUMBER OF UNITS: 2.00
LEFTOVERS: 0.75

BTU TIME SAFTEY MARGIN: 0.50
LAST UNIT HEIGHT RATIO: 0.75
ASPECT RATIO: 0.50

FIG. 6

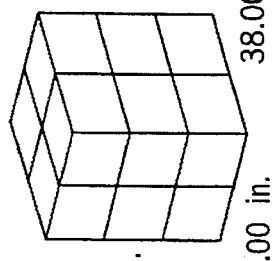
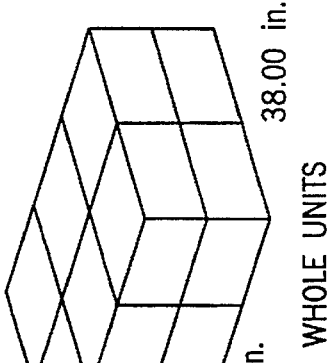

SOLUTION #1

UNIT HEIGHT: 43.09 in.
TIERS PER UNIT: 3
TIER PATTERN:
  2 BUNDLES LONG
  2 BUNDLES WIDE
BUNDLES PER UNIT: 12

BUNDLE HEIGHT: 14.36 in.
20 BUNDLES OF 85 SHEETS EACH
  (4 DISCHARGES)
40 BUNDLES OF 86 SHEETS EACH
  (8 DISCHARGES)
TOTAL BUNDLES: 60 (12 DISCHARGES)

TOTAL WHOLE UNITS: 5
NO PARTIAL UNIT 43.09 in.
38.00 in.
35.00 in.
5 WHOLE UNITS

20 BUNDLES X 85 SHEETS/BUNDLE + 40 BUNDLES X 86 SHEETS/BUNDLE = 5140 TOTAL SHEETS

DESIRABILITY: 2.00 (LINE) + 0.38 (MARGIN) + 1.20 (UNITS) + 0.75 (LAST) + 0.75 (LEFTOVERS) + 0.41 (ASPECT) = 5.48

FIG. 7

SOLUTION #2

UNIT HEIGHT: 28.72 in.
TIERS PER UNIT: 2
TIER PATTERN:
  2 BUNDLES LONG
  3 BUNDLES WIDE
BUNDLES PER UNIT: 12

BUNDLE HEIGHT: 14.36 in.
20 BUNDLES OF 85 SHEETS EACH
  (4 DISCHARGES)
40 BUNDLES OF 86 SHEETS EACH
  (8 DISCHARGES)
TOTAL BUNDLES: 60 (12 DISCHARGES)

TOTAL WHOLE UNITS: 5
NO PARTIAL UNIT 28.72 in.
38.00 in.
52.50 in.
5 WHOLE UNITS

20 BUNDLES X 85 SHEETS/BUNDLE + 40 BUNDLES X 86 SHEETS/BUNDLE = 5140 TOTAL SHEETS

DESIRABILITY: 2.00 (LINE) + 0.47 (MARGIN) + 1.20 (UNITS) + 0.75 (LAST) + 0.75 (LEFTOVERS) + 0.27 (ASPECT) = 5.44

FIG. 8

SOLUTION #3

UNIT HEIGHT: 43.42 in.         BUNDLE HEIGHT: 10.86 in.         TOTAL WHOLE UNITS: 5
TIERS PER UNIT: 4              60 BUNDLES OF 64 SHEETS EACH     NO PARTIAL UNIT
TIER PATTERN:                     (12 DISCHARGES)
  2 BUNDLES LONG               20 BUNDLES OF 65 SHEETS EACH
  2 BUNDLES WIDE                  (4 DISCHARGES)
BUNDLES PER UNIT: 16           TOTAL BUNDLES: 80 (16 DISCHARGES)

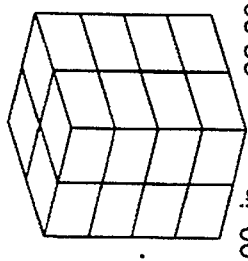

43.42 in.    35.00 in.    38.00 in.    5 WHOLE UNITS

60 BUNDLES X 64 SHEETS/BUNDLE + 20 BUNDLES X 65 SHEETS/BUNDLE = 5140 TOTAL SHEETS

THE LINE MUST BE SLOWED TO 337.8 FEET PER MINUTE. (CAUSE: STACKER)
SOLUTION NOT WITHIN DESIRED BTU TIME SAFETY MARGIN. (TIME AVAILABLE: 4.4 secs./FORK CYCLE)
DESIRABILITY: 1.69 (LINE) + 0.30 (MARGIN) + 1.20 (UNITS) + 0.75 (LAST) + 0.75 (LEFTOVERS) + 0.40 (ASPECT) = 5.10

FIG. 9

SOLUTION #4

UNIT HEIGHT: 29.06 in.         BUNDLE HEIGHT: 9.69 in.          TOTAL WHOLE UNITS: 5
TIERS PER UNIT: 3              80 BUNDLES OF 57 SHEETS EACH     NO PARTIAL UNIT
TIER PATTERN:                     (16 DISCHARGES)
  2 BUNDLES LONG               10 BUNDLES OF 58 SHEETS EACH
  3 BUNDLES WIDE                  (2 DISCHARGES)
BUNDLES PER UNIT: 18           TOTAL BUNDLES: 90 (18 DISCHARGES)

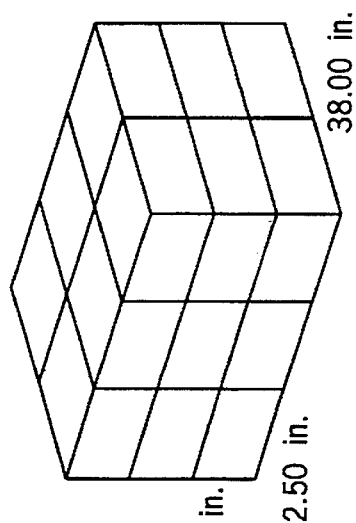

29.06 in.    52.50 in.    38.00 in.    5 WHOLE UNITS

80 BUNDLES X 57 SHEETS/BUNDLE + 10 BUNDLES X 58 SHEETS/BUNDLE = 5140 TOTAL SHEETS

THE LINE MUST BE SLOWED TO 300.8 FEET PER MINUTE. (CAUSE: STACKER)
DESIRABILITY: 1.50 (LINE) + 0.46 (MARGIN) + 1.20 (UNITS) + 0.75 (LAST) + 0.75 (LEFTOVERS) + 0.28 (ASPECT) = 4.94

FIG. 10

METHOD AND APPARATUS FOR AUTOMATICALLY FORMING CORRUGATED SHEETS INTO BLOCK-SHAPED UNITS OF OPTIMAL SIZE

BACKGROUND OF THE INVENTION

The invention relates to the packaging and handling of corrugated sheet material, and more particularly, to a method and apparatus for automatically stacking corrugated sheets into bundles, forming the bundles into tiers, and stacking the tiers into block shaped units of optimal size.

Mechanical bundle/tier/unit stacking systems are known in the art, but are relatively inefficient. One particular problem with such prior art systems is that when an order is to be run on a corrugator, an operator must make an initial determination of how many corrugated sheets should form a bundle, and how many bundles should form a tier, and how many tiers should form a unit to accommodate the total order of corrugated sheets placed. These initial determinations by the operator must take into consideration such things as the number of total corrugated sheets ordered, and the width and length of each of the corrugated sheets. These operator determinations usually result in an end unit that is not flat and therefore, is difficult to band.

It is also very difficult for such a system to produce units of a predetermined size. For example, a customer may wish to place an order of corrugated sheets and have them delivered in units of a desired size. On a fast paced corrugated production line, it is not possible for a scheduler, or an operator, to take the time and slow down the production line to calculate how best to arrange the bundles, and how many sheets to place in each bundle to satisfy such a desired result. Further, these prior art systems do not take into account the number of outs from the corrugator. For example, a particular order may be scheduled as a four-out on the corrugator, but the customer would like the unit to be delivered with a maximum width of three bundles. This would require loadbreaking the bundles just discharged from the stacker and re-accumulating the bundles into the appropriate units. This not only requires operator intervention, but also significantly slows the production line. It has been found that this is particularly difficult to do with short and narrow sheets. Further, at the end of an order, it is likely that there will be leftover bundles requiring the operator to manually form a level tier from the leftover bundles.

It has also been found that the aesthetic look of a unit in terms of sheet-to-sheet alignment is important because this is the product that sheet feeder corrugators sell. Further, misaligned sheets can be damaged when banding or handling which can result in a significant percentage of returned goods to the plant. It has also been found that short and narrow sheets are very difficult to run and achieve good stacking quality. It would be desirable for a sheet feeder corrugator to produce units of very well-aligned sheets, which would give producers a way of differentiating their product in the marketplace.

It would also be desirable to have a system that optimizes the unit construction by simply inputting the total number of sheets ordered, the sheet size, and have the ability to consider the number of outs scheduled on the corrugator, as well as other criteria if the customer so desires.

SUMMARY OF THE INVENTION

The present invention solves the above mentioned problems by providing an automated stacking system capable of constructing units of corrugated sheets according to the specifications of an order and the customer's desires and needs.

The present invention discloses a computer controlled stacking system for stacking corrugated sheets from a corrugator into bundles having an optimal number of corrugated sheets per bundle, and forming the bundles into tiers, and then forming the tiers into a block-shaped unit. The system comprises a computer programmed to determine the optimal number of corrugated sheets per bundle, and the optimal number of bundles per tier, and the optimal number of tiers per unit based upon input parameters, such as the desired corrugated sheet size and total sheet order. The sheet size may be input in terms of length, width, and caliper, as well as whether single wall or double wall corrugated sheets is desired. Based upon a set of machine parameters and algorithm parameters, and the aforesaid order parameters, the computer either generates all the possible solutions to an optimal unit size, or those possible solutions within a given time period.

The machine parameters define particular machine constraints and are usually not reset from order to order. The machine parameters may include a maximum unit height, width, and length that is allowed through the machine. The machine parameters may also include a maximum and minimum bundle height, as well as a minimum cycle time. A maximum line speed and a desired time safety margin may also be input as machine parameters.

The algorithm parameters are another set of parameters that are not normally adjusted from order to order. The algorithm parameters are based on the needs and desires of the customer and are used in ranking the solutions according to that particular customer's objectives. The algorithm parameters include a set of desirability weighting parameters which can be set to optimize line speed, if that is a major consideration for a particular customer. Alternatively, if the number of units produced is of more importance, that desirability weighting parameter may be set to optimize the total number of units produced. Other desirability parameters that may be set are a leftover unit parameter to minimize leftover units, an aspect ratio parameter to optimize unit stability, a time safety margin parameter to allow user intervention, or a last unit height parameter if the system is designed not to produce whole units. A customer need not choose just one parameter as being the most important, but may choose a combination of parameters to achieve their desired results. For example, a customer interested in production speed over specific characteristics of the unit, would set the line speed ratio parameter high and the time safety margin parameter low and the unit parameters somewhere in between.

The system further comprises an accumulator/separator operably connected to a corrugator downstacker to receive the bundles from the downstacker and selectively separate the bundles based on the optimal number of bundles per tier. A bidirectional conveyor receives the separated bundles from the accumulator/separator, and may shift a row of bundles according to receiving a command from the computer.

A tier inverter receives at least one row of separated bundles from the bidirectional conveyor to form a tier. The tier inverter may invert a tier upon receiving a command from the computer so as to place the inverted tier onto a non-inverted previously produced tier which will flatten any possible curling of the corrugated sheets.

A fork section is provided for receiving the tier from the tier inverter and has a plurality of forks for transferring the tier. A command from the computer to the fork section selects only the number of forks necessary to move the tier according to that tier's width.

A unitizer section receives the tier from the selected forks, aligns and squares the bundles on the tier and that tier with respect to any previous tier on the unitizer section. A particular advantage of this system is that since only a selected number of forks are used for moving the tier into the unitizer section, the alignment can occur as the selected forks are being withdrawn.

The present invention also discloses a method of automatically sorting corrugated sheets into a unit of optimal size for shipment. The method comprises initially inputting a set of machine parameters comprising specifications relating to the machinery constraints, and a set of algorithm parameters defining the desirability factors. Thereafter, an operator is given the opportunity for inputting a set of order parameters for a particular order. The method further comprises automatically generating an optimal unit size based on the order parameters and the machine parameters, and ranking the solutions according to the algorithm parameters. The method forms a unit that comprises at least one tier, and each tier comprises at least one bundle, and each bundle comprises a plurality of corrugated sheets. The resulting unit is block-shaped with substantially planar sides for ease of banding since the resulting unit has no irregularities due to mismatched bundles in the unit.

Various benefits, objects, and advantages of the invention will be made apparent from the following detailed description taken together with the drawings.

BRIEF DESCRIPTION OF THE DRAWINGS

FIG. 2 is perspective view of an exemplary unit produced by the system of FIG. 1.

FIG. 6 is a listing of machine, order and algorithm parameters which are examples of those which can be used in the system of the present invention.

FIGS. 7–11 show examples of the output of the computer system of FIG. 1.

DETAILED DESCRIPTION OF THE PREFERRED EMBODIMENT

The present invention comprises a method of automatically sorting corrugated sheets into a unit of optimal size for shipment. The method comprises the steps of inputting a set of order parameters comprising corrugated sheet specifications for a particular order. The ordering parameters can include a desired corrugated sheet length, a desired corrugated sheet width, a desired corrugated sheet caliper or thickness, a desired total number of corrugated sheets, and whether the order is for single wall corrugated sheets or double wall corrugated sheets.

The method also comprises the step of inputting a set of machine parameters comprising the specifications relating to machinery constraints such as a maximum unit height, a maximum unit length, a maximum unit width, a maximum bundle height, a minimum bundle height, a minimum cycle time, a maximum line speed, and a desired time safety margin.

The method also comprises a step of automatically generating an optimal unit size based upon the order parameters and the machine parameters. The unit is optimized by optimizing the components of the unit, namely, the bundles and the tiers. A bundle is comprised of an optimal number of corrugated sheets, and each tier is comprised of an optimal number of bundles, and the unit is comprised of an optimal number of tiers. The resulting unit is block-shaped with substantially planar sides such that there are no irregularities and the unit is easily banded for shipping.

There are several characteristics which make a unit size optimal, and what one user or customer may consider a highly desired characteristic in a unit, another may consider that characteristic of less importance. To allow for the customization of this system, the method further comprises the step of inputting algorithm parameters which include a set of desirability factors. The step of generating an optimal unit size is further defined to comprise generating a set of optimal unit size solutions. This method further comprises the step of ranking the set of solutions based upon the set of desirability factors and producing a single solution that is based upon a particular customer's, or user's, needs and desires. The desirability factors can be further defined as weighting parameters, and can include a line speed ratio parameter, a desired number of units parameter, a leftover unit parameter, an aspect ratio parameter, a time safety margin parameter, and a last unit height ratio parameter. It is noted that, the last unit height ratio parameter is used only if it is not desired to have all whole units.

Figure 1:
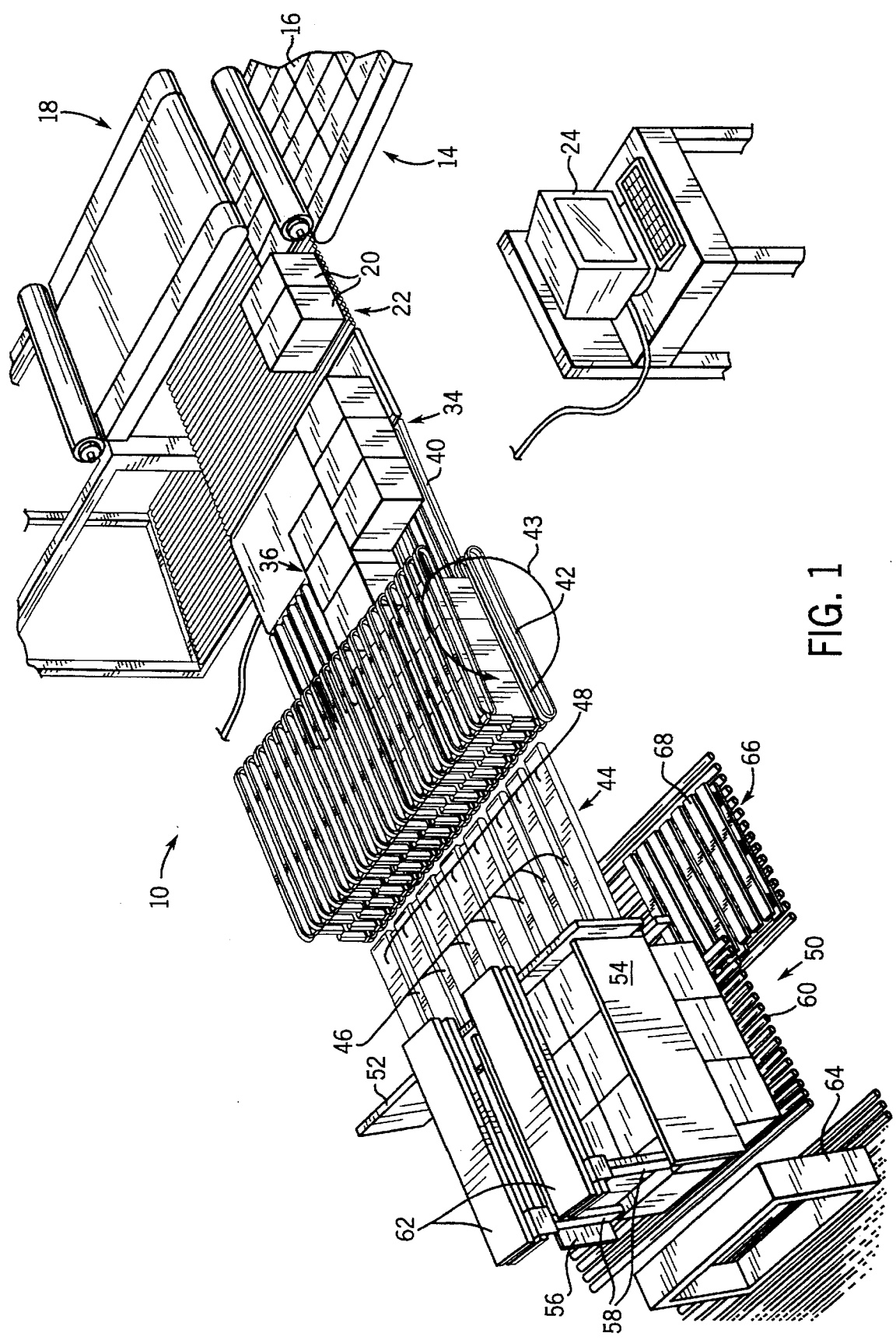
FIG. 1 is a perspective view of a system in accordance with the present invention.

Referring to FIG. 1, an automated stacking system 10 is disclosed for stacking corrugated sheets 12 from a corrugator 14. The corrugator 14 simultaneously produces a number of corrugated sheets 12 which define the outs that the corrugator 14 is currently cutting the corrugated material 16 in a longitudinal direction. Corrugators are well known in the art, and it is also well known to modify the number of outs of a corrugator to produce varying widths of corrugated sheets 12. FIG. 1 shows an example of a corrugator set to produce five outs.

For illustrative purposes, FIG. 2 shows an exemplary unit 26 which is comprised of at least one bundle 20. Unit 26 has three tiers 28, 30 and 32. Unit 26 also comprises two rows 34 and 36 of bundles, and a total of six stacks 38.

Corrugator 14 also cuts the corrugated material 16 in a direction perpendicular to the longitudinal cuts defining the number of outs. A downstacker 18 accumulates and stacks the corrugated sheets 12 into bundles of corrugated sheets according to an optimal number of corrugated sheets. When the corrugated sheets 12 are stacked to a height of a desired bundle 20, an accumulator/separator 22, which is operably connected to the downstacker 18, receives the bundles 20 from the downstacker 18 and selectively separates the bundles based on the optimal number of bundles per tier determined by the computer 24. The function of the computer is described later in detail with reference to FIGS. 3–5.

The accumulator/separator 22 separates the bundles into a row 34, 36 of bundles, which row of bundles may be more or less than the number of outs from corrugator 14. A bidirectional conveyor 40 receives the separated bundles that form the row 34, 36 of bundles from the accumulator/separator 22. The accumulator/separator 22 retains the bundles 20 which remain from the difference between the number of outs from the accumulator 14 and the number of bundles comprising a row 34, 36 of bundles.

The bidirectional conveyor 40 is capable of selectively shifting a row 36 of separated bundles to accommodate a second row 34 of separated bundles upon receiving a shift command from the computer 24. In this manner, a tier is formed of two rows of separated bundles. In the absence of a shift command from the computer 24, a tier will comprise a single row of separated bundles.

A tier inverter 42 is operably connected to the bidirectional conveyor 40 and receives at least one row of separated bundles from the bidirectional conveyor 40 to form a tier. Upon receiving an invert command from the computer 24, the tier inverter 42 inverts the tier as indicated by arrow 43. In the absence of receiving an invert command from the computer 24, the tier inverter passes the tier uninverted.

A fork section 44 receives the tier from the tier inverter 42. The fork section comprises a plurality of forks 46 located between a plurality of conveyor belts 48 which can be raised and lowered by commands from the computer. The conveyor belts 48 transfer the tier from the tier inverter 42 while raised, then lowers the tier onto forks 46. The plurality of forks 46 move fore and aft within conveyor belts 48 and further moves the tier along the axis of the stacking system 10. The fork section 44 receives a fork selection command from the computer 24 that selects only a number of forks required to move the tier further down the system. The number of forks required to move a tier correspond to the width of a particular tier.

A unitizer section 50 receives the tier from the selected forks 46 and is capable of aligning the tier as the selected forks 46 are being withdrawn since only enough forks are used as is necessary to move a tier into the unitizer. Unitizer section 50 comprises a lift gate 52 which moves perpendicular to the forks 46 to allow a tier to be moved into the unitizer section while in an open position. After a tier is within the unitizer section 50, lift gate 52 is lowered into a closed position and acts as a fixed backstop. The unitizer section also comprises a fixed side stop 54 and a movable side tamper 56. The fork unitizer also comprises rear tampers 58, which in conjunction with side tamper 56 square-off and align the tier against lift gate 52 and fixed side stop 54. Side tamper 56 moves parallel with pallet lift 60. Rear tampers 58 are pivotally connected to the unitizer top section 62 to tamp the tier into alignment and swing upward to discharge completed units.

After a unit is formed within the unitizer section 50, a pallet lift 60 is lowered and rear tampers 58 are swung upward to allow the unit to move to a banding section, which may include a bander throat 64.

When in a pallet mode, as dictated by computer 24, a pallet staging area 66 provides for automatic loading of a new pallet 68 as the completed palletized unit is discharged into the banding section.

Figure 3:
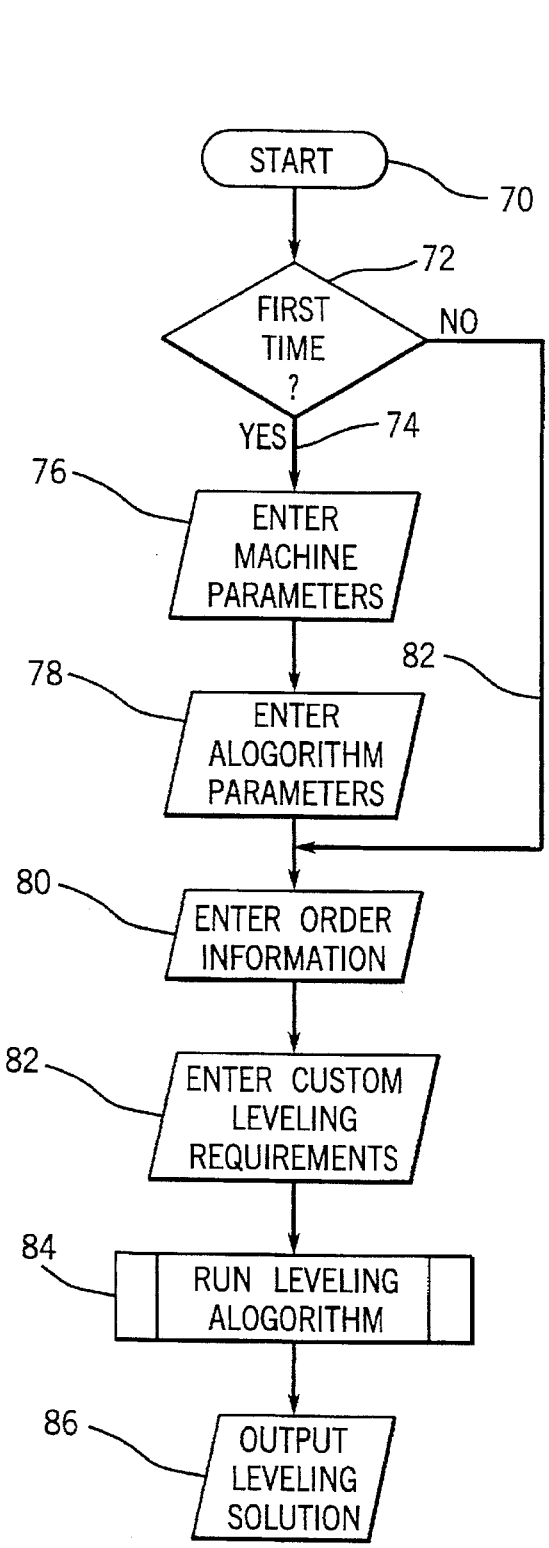
FIG. 3 is a flow chart used to implement the system of FIG. 1.
Figure 5:
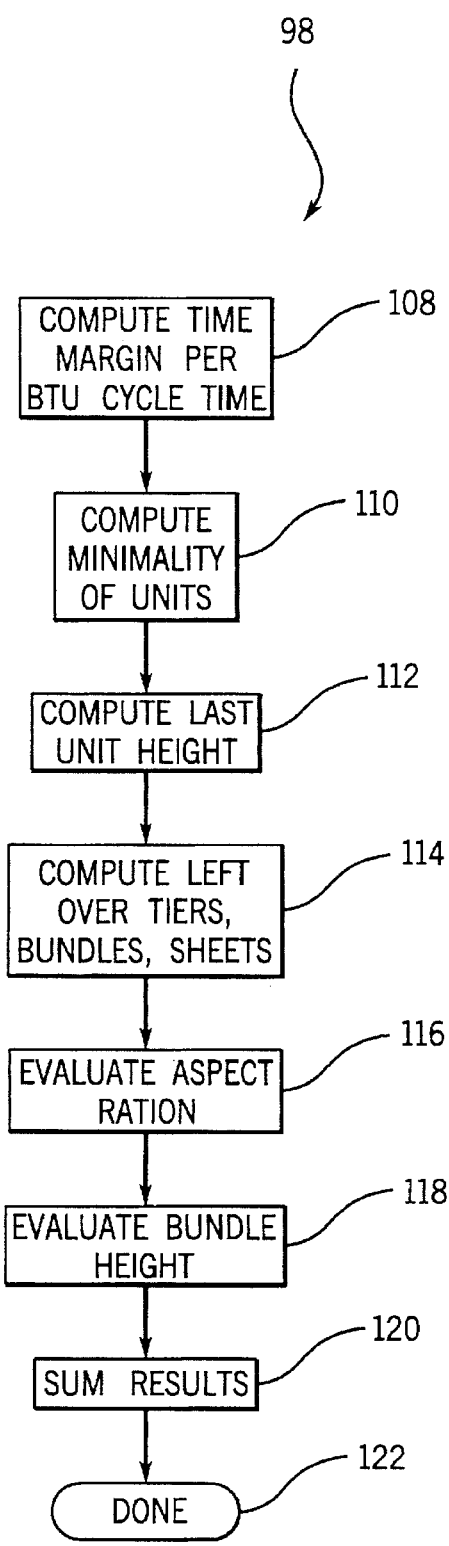
FIG. 5 is a flow chart further describing a portion of FIG. 4.
Figure 4:
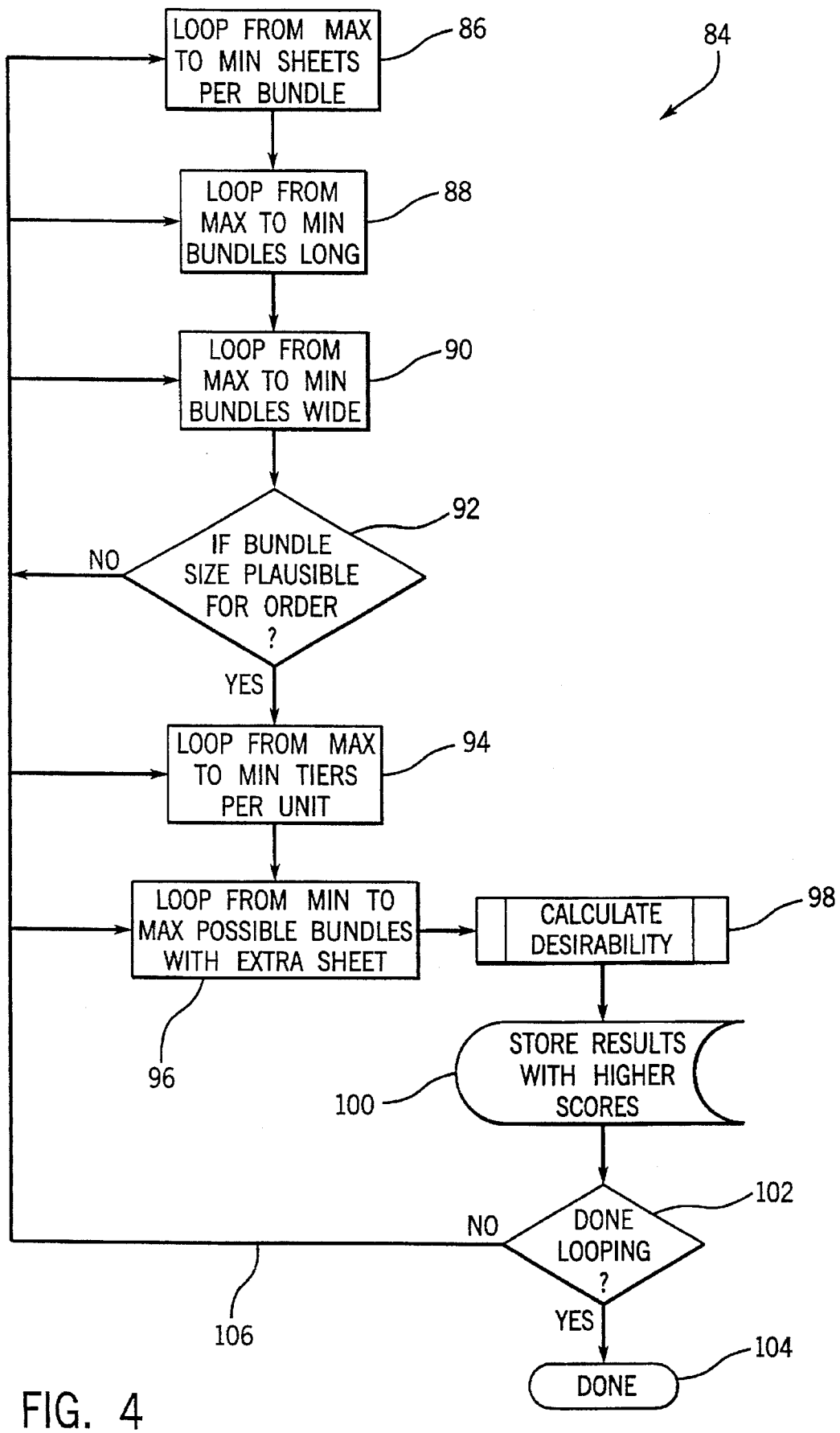
FIG. 4 is a flow chart further describing a portion of FIG. 3.

FIGS. 3–5 show flow charts for implementing the computer 24 according to the present invention. However, before describing the flow charts in detail, a brief overview of the algorithm is provided for ease of understanding. There are two main parts to this algorithm. The first, shown and described with reference to FIG. 4, is designed to find all practical solutions that give level tiers for the given order information, algorithm parameters, and machine parameters. A basic requirement of this system is that the mathematical product of the number of tiers times the number of individual bundles in the tier be evenly divisible by the number of outs from the corrugator downstacker in order that all the bundles fit into a unit with no leftover bundles.

The second part, shown and described with reference to FIG. 5, is a desirability function that quantifies how desirable each of the solutions found in the first part is, with respect to a customer's desires. This function allows customers to customize the system according to their own needs and desires. After scoring all the practical solutions, the solutions are ranked in order of preference for that customer, and the best solution is selected.

There are two basic variables that can be varied to obtain practical solutions. The first is the bundle height or the number of sheets in the bundle. The second is the unit configuration—that is, how the bundles are combined to form a unit. The algorithm and machine parameters place constraints on these variables to eliminate solutions that are not physically possible for a particular machine, or are completely unacceptable to the customer.

Once a solution has been found, it is evaluated based upon the desirability function. Each desirability function factor has an associated desirability weighting parameter that is adjustable by the customer to customize the system. The solutions are then ranked according to how the customer sets the desirability weighting parameters. Examples of desirability functions that the customer can adjust include maximizing line speed, varying the time an operator has to perform manual manipulations within the system, and minimizing the number of units produced for a particular order. Also, if it is not important to the customer to have all whole units, the height of the last unit may be customized. Although the best solutions will not require operator intervention, for some short orders, operator intervention may allow the line to run faster and therefore, a leftover parameter is provided for customer modification. An aspect ratio parameter allows the customer to customize the stability of the unit.

The approach taken in finding the optimal solution in the preferred embodiment, is to loop through all possible unit configurations for a given order, and select the ones that match the basic criteria set forth in the machine and order parameter inputs. A desirability factor for that configuration is computed, and the solutions are ranked with the highest desirability factor being considered the best solution.

Referring to the flow charts for the detail in implementing this preferred embodiment, and in particular FIG. 3, upon power up 70, a check is made 72 as to whether the machine parameters and algorithm parameters have previously been entered. If not 74, the machine parameters are entered 76, the algorithm parameters are entered 78, and the order information is entered 80. If, however, the machine parameters and algorithm parameters have already been entered 81, then the operator need only enter the order parameters 80. Although the flow chart shows that the machine and algorithm parameters are not entered after they are initially entered, it is noted that it is possible to change the machine and algorithm parameters at any time if an operator so desires. However, during normal operation, the operator will only need to change the order information.

After entering the order information 80, the customer has the option of restricting the solutions to customer defined requirements 82. This option allows the system to build units of predefined dimensions, if those predefined dimensions satisfy a possible solution considering the aforesaid mentioned inputs.

The leveling algorithm is then run 84, which is described in detail with reference to FIG. 4. The solution, or solutions, are output to the stacking system and if so desired, to the computer terminal's monitor. On a fully automated operation, only the best choice would be used by the system. Where intervention is allowed, a number of top solutions can be displayed, including a graphical representation of the unit, and an operator may choose any solution desired.

Referring to FIG. 4, the leveling algorithm 84 is described in detail. As is shown by the overall configuration of this flow chart, for every change in the progressing outer loops, there are many changes in the inner loops. The nested loops only change one parameter at a time, and therefore, all practical solutions that satisfy the system parameters are located. Initially, the outermost loop 86 is run from the maximum number of sheets per bundle to the minimum sheets per bundle. The next inner loop 88 runs from the maximum bundle length, to the minimum bundle length. The next inner loop 90 runs from the maximum bundle width, to the minimum bundle width, after which a decision is made 92 as to whether the bundle size is plausible for an order. In other words, if the total number of sheets in an order can be accomplished considering the number of outs, the system continues. Otherwise, if that particular solution does not satisfy the plausibility requirement, that bundle size is eliminated. The criteria used for plausibility is whether the number of tiers times the number of bundles in a tier is evenly divisible by the number of outs such that all the bundles fit into a unit with no bundles left over.

The next inner loop 94 decrements the tiers per unit from the maximum to the minimum. The last loop 96 increments from the minimum possible bundles with an extra sheet, to the maximum possible bundles with an extra sheet. Although loop 96 is not strictly required, it has been found that adding one extra sheet per bundle to a limited number of bundles, provides for a substantially increased number of solutions, while not significantly altering the unit levelness.

Once a solution is found, the desirability is calculated 98 which is described in detail with reference to FIG. 5. The results of the desirability calculations are stored and ranked 100. The desirability scores are ranked with the higher scores being better solutions. A decision is made as to whether the looping has been completed 102, and if so, the system has reached its end 104.

If the system is not done looping 106, it returns to the innermost loop not yet complete. For example, if looping is not complete 106, and loop 96 has not reached the maximum possible bundles with an extra sheet, loop 96 is repeated after being incremented. If the maximum possible bundles with an extra sheet has been reached in loop 96, then the system goes to loop 94 until the minimum tiers per unit is reached, at which point the system goes to loop 90 until the minimum bundle width is reached. After which, the system goes to loop 88 until the minimum bundle length is reached, and then finally to loop 86 until the minimum sheets per bundle is reached. When a particular inner loop has been reached, and the system goes to the next outer loop, all previous inner loops are reset. In this manner, all practical solutions for the given set of parameters are obtainable.

The desirability calculations 98 are shown in detail in FIG. 5. It is noted that each of the desirability factors 108–118 have corresponding weighting parameters, as previously discussed, that the customer can modify to customize the system. The first desirability factor computed is the time margin per BTU (bundle/tier/unit) cycle time 108 which compares the speed that the corrugated material can be delivered to the stacking system versus the speed the corrugated material can be processed in the stacking system. This desirability factor determines whether the stacking system can operate as fast as the corrugator, without slowing the corrugator. If, on the other hand, a particular order dictates that the corrugator must be slowed, the amount of slowdown is determined and displayed with the solution.

The second desirability factor calculated is the minimality of the units 110. This function compares the number of units generated by this specific solution versus the theoretical minimum number of units possible. It is noted that the theoretical minimum number of units may not be the most desirable because, for example, it may slow the speed of the system, or it may not be the size of the unit desired, or it may have the wrong aspect ratio.

The next desirability factor calculated is the last unit height 112 which is only functional if the operator does not choose all whole units. This function compares the height of the last unit relative to the other units, and also to its absolute height. For example, a solution that has 10 bundles that are 38 inches high and having a last unit only 6 inches high, may not be desirable. A solution having 10 units 40 inches high, or 11 units being 30 inches high may be more desirable. The solution set will reflect these desires depending upon the weighting parameter set by the customer.

The next desirability factor calculated is the leftover tiers, bundles, sheets factor 114. This function assigns a penalty for leftover sheets, bundles or tiers.

Next, the aspect ratio is evaluated 116, which evaluates the shortest of the three dimensions of the unit to the longest of the three dimensions. The goal of the aspect ratio evaluation is to obtain a unit as close to being cube-shaped, as is possible. Finally, the bundle height is evaluated 118 which evaluates the proximity of the bundle height relative to the customer's desires.

The results of the aforesaid computations and evaluations 108–118 are summed at 120 and the system is returned 122 to store and rank the results 100, FIG. 4.

In summary, the system computes the practical solutions, either in the allotted time allowed, or alternatively, all practical solutions. After the solutions have been found, the desirability weighting parameters are applied to each of the solutions, and the solutions are ranked according to the desirability weights. The best solution according to the desirability weights is stored in memory, and the system loops until all the solutions are found, or the system times out, at which time the best solution is used to run the stacking system.

FIGS. 7–11 include an example of the output from the computer. FIG. 6 shows the machine parameters, the order parameters, and the algorithm parameters showing the individual desirability weighting factors. However, the algorithm parameters are not normally displayed in the output of the preferred embodiment.

The search time was limited to 3.0 seconds and FIGS. 7–11 show the top five solutions. The system can be set to limit the number of solutions obtained to a desired number, or it can calculate all practical solutions within the set search time. For example, the parameters of FIG. 6 can produce 53 solutions within the search time of 3.0 seconds. Of course, the number of solutions obtained within a given time is dependent upon the computer microprocessor.

As shown by FIGS. 7–11, Solution #1 is the most desirable solution based upon the desirability weighting factors set in the algorithm parameters of FIG. 6. The desirability of Solution #1 was calculated as 5.48, and the desirability of Solutions #2–5 decrease respectively.

As previously discussed, the ranking of these solutions is based upon the desirability weighting factors. Since the Line Speed Ratio and the Number of Units are set with a weighting factor of 2.00, while the remaining factors are less than 1, the ranking of the solutions optimizes the unit according to the preferences of the customer by placing the greatest weight upon the Line Speed Ratio and Number of Units produced.

The desirability result of the Line Speed in Solution #1 is 2.00 because producing units according to Solution #1 does not slow the speed of the line at all. In contrast, Solutions #3, #4 and #5 slow the line speed as indicated in FIGS. 9, 10 and 11.

The other most desirable factor, in this example, is the Number of Units produced. Solutions #1–4, all produce five whole units. However, only Solution #1 does not slow the line speed while still producing a unit close to the desired height. Maintaining the desired height is relatively important to the customer because it is a limiting factor in maximizing the transportation of the units.

Solution #5 produces only four whole units which is more desirable in terms of whole units produced, but Solution #5 also requires the line speed to be slowed to 221.7 feet per minute, whereas Solution #1 can run at the maximum speed of 1,000 feet per minute. Therefore, although Solution #5 produces one less unit, the difference in line speed more than offsets producing one extra unit in Solution #1. Similarly, it is noted that Solution #2 is capable of running at the maximum line speed as well, however, Solution #2 does not produce units close to the desired height, and is therefore not as desirable overall.

As is evident from a review of FIGS. 6–11, the system can easily be manipulated by changing the desirability weighting factors to obtain a solution most desirable by the customer. Further, since solutions can be obtained literally in seconds, the customer can manipulate the inputs and see the actual results as a graphical representation of the unit as produced on the computer monitor practically instantaneously.

It is recognized that equivalents, alternatives, and modifications are possible, and are within the scope of the appending claims.

We claim:

1. A stacker system for combining bundles of corrugated sheets from a corrugator into tiers, and for combining the tiers into a block-shaped unit comprising:
   means for inputting a selected corrugated sheet size;
   means for automatically determining a number of corrugated sheets per bundle, a number of bundles per tier, and a number of tiers per unit based on the selected corrugated sheet size;
   means for stacking the corrugated sheets into bundles based on the number of corrugated sheets per bundle, the means for stacking the corrugated sheets being operatively responsive to the means for determining;
   means for forming at least one tier of bundles based on the number of bundles per tier, the means for forming being operatively responsive to the means for stacking; and
   means for stacking the tiers into a block-shaped unit based on the number of tiers per unit, the means for stacking the tiers being operatively responsive to the means for forming.

2. The stacker system of claim 1 further comprising an input means for inputting a total number of corrugated sheets ordered.

3. The stacker system of claim 2 wherein the input means further inputs a number of outs scheduled on the corrugator to the determining means to create a number of bundles equal in number to the number of outs, which number of outs corresponds to the number of corrugated sheets produced simultaneously from the corrugator.

4. The stacker system of claim 2 wherein the means for determining calculates optimal unit dimensions.

5. The stacker system of claim 4 wherein the input means inputs a bander throat size and an aspect ratio, and wherein the system further comprises means for optimizing corrugator speed and the unit dimensions based on the bander throat size and the aspect ratio.

6. The stacker system of claim 2 wherein the input means further inputs desired unit dimensions, and the means for determining optimizes the number of corrugated sheets per bundle, the number of bundles per tier, and the number of tiers per unit such that the unit dimensions are substantially equal to the desired unit dimensions.

7. The stacker system of claim 1 further comprising means for controlling the corrugator to simultaneously produce the corrugated sheets, and wherein the corrugator simultaneously produces a number of corrugated sheets, said number corresponding to a number of outs from the corrugator, and wherein the corrugator comprises a means for selectively modifying the number of outs, and wherein the means for determining further comprises an out input for inputting the number of outs from the corrugator and wherein the system further comprises means for modifying the number of corrugated sheets per bundle, the number of bundles per tier, and the number of tiers per unit based on the number of outs from the corrugator.

8. The stacker system of claim 7 further comprising a means for accumulating a first row of bundles based on the number of bundles per tier, and further comprising means for controlling the accumulating means.

9. The stacker system of claim 8 further comprising a means for shifting the first row of bundles, and wherein the means for accumulating accumulates a second row of bundles adjacent the first row of bundles, such that a first tier is formed, and further comprising means for controlling the means for shifting.

10. The stacker system of claim 1 further comprising a means for inverting a tier of bundles capable of passing a first tier of bundles uninverted, and selectively inverting a second tier of bundles such that the top of the second tier of bundles is placed in contact with the top of the first tier of bundles, and further comprising means for controlling the means for inverting.

11. The stacker system of claim 1 further comprising a fork section, said fork section having a plurality of forks for moving a tier of bundles from the means for forming a tier to the means for stacking the tiers, such that the means for automatically determining selects a number of forks for moving the tier based on a width of the tier being moved, and further comprising means for controlling the fork section.

12. The stacker system of claim 11 further comprising a unitizer section for forming a unit, wherein the unitizer section aligns the bundles in each tier and aligns the tier in the unit, as the number of forks are being withdrawn, and further comprising means for controlling the unitizer section.

13. The stacker system of claim 1 wherein the means for automatically determining determines a set of possible solutions, and the stacker system further comprises a means for ranking the possible solutions based on desirability.

14. The stacker system of claim 13 further comprising input means for weighted desirability parameters for input to the determining means.

15. The stacker system of claim 14 wherein the weighted desirability parameters comprise a line speed ratio parameter, a desired number of units parameter, a leftover unit parameter, an aspect ratio parameter, a time safety margin parameter, and a last unit height ratio parameter.

16. The stacker system of claim 1 further comprising an order input means for inputting to the determining means a desired corrugated sheet length, a desired corrugated sheet width, a desired corrugated sheet caliper, a desired total number of corrugated sheets, and a choice of single wall corrugated sheets or double wall corrugated sheets.

17. The stacker system of claim 1 further comprising a machine parameter input means for inputting to the determining means a maximum unit height, a maximum unit length, a maximum unit width, a maximum bundle height, a minimum bundle height, a minimum cycle time, a maximum line speed, and a desired time safety margin.

18. A method of optimizing the size of a unit of corrugated sheets comprising the steps of:

inputting a set of order parameters comprising corrugated sheet specifications for a particular order;

receiving the set of order parameters;

inputting a set of machine parameters comprising specifications relating to machinery constraints;

receiving the set of machine parameters;

determining the optimal unit size based upon the order parameters and the machine parameters; and, automatically generating an optimal unit size based upon the order parameters and the machine parameters, wherein a unit comprises at least one tier, each tier comprising at least one bundle, and each bundle comprising a plurality of corrugated sheets, and wherein the unit is block-shaped with substantially planar sides.

19. The method of claim 18 further comprising the steps of inputting a set of desirability factors and receiving the set of desirability factors, the step of generating an optimal unit size is further defined to comprise generating a set of optimal unit size solutions, and wherein the method further comprises the step of ranking the set of solutions based upon the set of desirability factors.

20. An automated stacking system for stacking corrugated sheets from a corrugator that simultaneously produces a number of corrugated sheets defining a number of outs from the corrugator, the corrugator having a downstacker for accumulating corrugated sheets into bundles equal in number to the number of outs, the automated system comprising:

a computer programmed to determine a solution to optimizing a unit by determining an optimal number of corrugated sheets per bundle, and an optimal number of bundles per tier, and an optimal number of tiers per unit based on at least one input parameter;

means for inputting the input parameter into the computer;

an accumulator/separator operably connected to the downstacker to receive the bundles from the downstacker and selectively separate the bundles based on the optimal number of bundles per tier, the accumulator/separator being operatively responsive to the computer;

means for controlling the accumulator/separator;

a bidirectional conveyor receiving the separated bundles from the accumulator/separator, the bidirectional conveyor being operatively responsive to the accumulator/separator;

means for controlling the bidirectional conveyor;

a tier inverter for receiving at least one row of separated bundles from the bidirectional conveyor to form a tier, and inverting the tier upon receiving an invert command from the computer, otherwise passing the tier uninverted, the tier inverter being operatively responsive to the bidirectional conveyor;

means for controlling the tier inverter;

a fork section for receiving the tier from the tier inverter and comprising a plurality of forks, wherein the fork section receives a fork selection command from the computer selecting only a number of forks required to move the tier, the fork section being operatively responsive to the tier inverter;

means for controlling the fork section;

a unitizer section for receiving the tier from the selected forks and aligning the tier as the selected forks are being withdrawn, the unitizer section being operatively responsive to the fork section; and, means for controlling the unitizer section.

21. The automated stacking system of claim 20 wherein the input parameter is a selected corrugated sheet size.

22. The automated stacking system of claim 20 wherein the bidirectional conveyor selectively shifts a row of separated bundles to accommodate a second row of separated bundles upon receiving a shift command from the computer.

23. The automated stacking system of claim 20 wherein the computer has an order input menu operative to receive a desired corrugated sheet length, a desired corrugated sheet width, a desired corrugated sheet caliper, a desired total number of corrugated sheets, and a choice of single wall corrugated sheets or double wall corrugated sheets.

24. The automated stacking system of claim 20 wherein the computer has an machine parameter menu operative to receive a maximum unit height, a maximum unit length, a maximum unit width, a maximum bundle height, a minimum bundle height, a minimum cycle time, a maximum line speed, and a desired time safety margin.

25. The automated stacking system of claim 20 wherein the computer is further programmed to input and receive a set of weighted desirability parameters, and to generate multiple sets of possible solutions, and rank the solutions based upon the weighted desirability parameters.

26. The automated stacking system of claim 25 wherein the weighted desirability parameters comprise at least one of a line speed ratio parameter, a desired number of units parameter, a leftover unit parameter, an aspect ratio parameter, a time safety margin parameter, and a last unit height ratio parameter.

27. The automated stacking system of claim 20 wherein the unitizer section further comprises a set of tampers for squaring off and aligning the tier.

28. The automated stacking system of claim 20 wherein the unitizer section further comprises a lift station for lowering the tiers as each additional tier is moved into the unitizer section, and for removing the unit from the unitizer section.

* * * * *